United States Patent
Kobayashi et al.

(10) Patent No.: US 6,617,375 B2
(45) Date of Patent: Sep. 9, 2003

(54) NON-ASBESTOS FRICTION MATERIALS

(75) Inventors: Mitsuru Kobayashi, Gunma-ken (JP); Shinya Sawamura, Gunma-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/796,530

(22) Filed: Mar. 2, 2001

(65) Prior Publication Data

US 2001/0025064 A1 Sep. 27, 2001

(30) Foreign Application Priority Data

Mar. 3, 2000 (JP) ........................ 2000-058348

(51) Int. Cl.⁷ ................ F16D 69/02; C08K 3/04; C08J 5/14
(52) U.S. Cl. ................ 523/156; 523/153; 524/15
(58) Field of Search ................ 523/156, 153; 524/15

(56) References Cited

U.S. PATENT DOCUMENTS 5,268,398 A * 12/1993 Nakagawa et al.
5,866,636 A * 2/1999 Nitto et al.

FOREIGN PATENT DOCUMENTS

| JP | 04-234477 | * 8/1992 |
| JP | 05-279656 | * 10/1993 |
| JP | 05-331452 | * 12/1993 |
| JP | 06-306186 | * 11/1994 |

* cited by examiner

*Primary Examiner*—David J. Buttner
(74) *Attorney, Agent, or Firm*—Birch, Stewart, Kolasch & Birch, LLP

(57) ABSTRACT

A non-asbestos friction material is obtained by molding and curing a composition comprising a fibrous base, a filler and a binder. The binder is present in a total amount $V_1$ and the filler contains in part graphite present in an amount $V_2$, each expressed in volume percent of the overall composition, such that the product $V_1 \times V_2$ is from 10 to 100 and the sum $V_1 + V_2$ is from 10 to 30. When used as a brake lining in drum brakes, for example, the friction material exhibits low wear during high-speed braking, excellent heat resistance, stable braking effectiveness and good strength.

4 Claims, No Drawings

NON-ASBESTOS FRICTION MATERIALS

BACKGROUND OF THE INVENTION

1. Field of the Invention

The present invention relates to non-asbestos friction materials which are particularly well suited for use as brake linings in drum brakes because they undergo little wear during high-speed braking and have an excellent heat resistance, a stable braking performance and good strength.

2. Prior Art

Drum brake friction materials used for braking in automobiles, large trucks, railroad cars and various industrial equipment are required to have a number of performance features. These features include not only an excellent braking effectiveness (i.e., a high friction coefficient), but also a high heat resistance, minimal noise generation, and good strength to prevent cracks from forming when the friction material is bolted or riveted to the brake shoe.

Unlike in disk brakes, the brake shoe and brake lining in drum brakes are situated at the interior of the drum, making it difficult for heat generated during braking to dissipate to the exterior. As a result, the brake shoe and the friction material at the surface of the brake lining are scorched by heat, which greatly reduces braking effectiveness and tends to lead to brake fade. Accordingly, there is a strong desire for better heat resistance.

Moreover, the development of extensive highway networks and the increased use of long-distance transportation in recent years have brought about a sharp rise in the frequency of high-speed braking, greatly increasing both the amount of wear by the brake linings and, owing to the thermal history, the frequency of cracking at the surface of the lining against which the brake drum rubs.

Various attempts have been made to resolve these problems in frictional materials for drum brakes. Such efforts have included adding a large amount of graphite as a lubricant to reduce noise (in which case the amount of binder also increases), enhancing heat resistance by adding cashew dust that discharges little tar when heated, and including a higher proportion of binder to improve the strength of the friction material.

However, none of these approaches has succeeded in providing friction materials for drum brakes with all the desired performance features. Indeed, the prospects for developing in particular a friction material for drum brakes endowed with low wear during high-speed braking, stable brake effectiveness, and excellent heat resistance have been regarded as very poor.

SUMMARY OF THE INVENTION

Therefore, the object of the present invention is to provide a high-quality non-asbestos friction material having low wear during high-speed braking, excellent heat resistance, stable braking effectiveness and good strength.

The inventor has found that, in non-asbestos friction materials, incorporating high-tar cashew dust and lowering the amount of binder and graphite are effective ways for achieving reduced wear during high-speed braking, improved heat resistance and other desirable aims.

That is, in non-asbestos friction materials obtained by molding and curing a composition comprising a fibrous base, a filler and a binder, the incorporation of a high-tar cashew dust as at least part of the filler results in the formation by the high-tar cashew dust of a thin, uniform organic film on the friction surface, thereby reducing the amount of friction material wear during high-speed braking and stabilizing braking effectiveness. Also, by having the total amount $V_1$ of binder present in the friction material composition and the amount $V_2$ of graphite present as part of the filler (both amounts being expressed in volume percent based on the overall composition) be such that the product $V_1 \times V_2$ is from 10 to 100 inclusive and the sum $V_1 + V_2$ is from 10 to 30 inclusive, the level of organic components can be held much lower than in the prior art. This makes it possible to achieve a high-quality non-asbestos friction material having a greatly improved heat resistance and, together with this, an excellent performance during high-speed braking.

The inventor has also found that, in non-asbestos friction materials comprising a molded and cured composition that includes a fibrous base, a filler and a binder, when the filler is at least partially composed of 1 to 35 vol % of high-tar cashew dust and less than 5 vol % of graphite and when the binder is present in a total amount of at most 30 vol %, based on the overall composition, these components work together to lower the amount of wear. As a result, in spite of the presence of much lower amounts of graphite and binder than in prior-art non-asbestos friction materials, or rather because of the presence of graphite and binder in such small amounts, the friction material has a vastly improved heat resistance. Hence, there can be obtained a high-quality non-asbestos friction material having low wear during high-speed braking, excellent heat resistance, stable braking effectiveness and sufficient strength to prevent crack formation when the friction material is bolted or otherwise mounted on a brake shoe.

Therefore, according to a first aspect, the invention provides a non-asbestos friction material obtained by molding and curing a composition comprising a fibrous base, a filler and a binder; wherein the binder is present in a total amount $V_1$ and the filler includes in part graphite present in an amount $V_2$, each expressed in volume percent of the overall composition, such that the product $V_1 \times V_2$ is from 10 to 100 inclusive and the sum $V_1 + V_2$ is from 10 to 30 inclusive.

According to a second aspect, the invention provides a non-asbestos friction material obtained by molding and curing a composition comprising a fibrous base, a filler and a binder; wherein the filler is at least partially composed of 1 to 35 vol % of high-tar cashew dust and less than 5 vol % of graphite, based on the overall composition, and the binder is present in a total amount of at most 30 vol %.

DETAILED DESCRIPTION OF THE INVENTION

The non-asbestos friction material of the invention is made by molding and curing a non-asbestos friction material composition composed primarily of a fibrous base, a filler and a binder. According to a first embodiment of the invention, the friction material includes the binder in a total amount $V_1$ and includes as part of the filler graphite in an amount $V_2$ (both amounts being expressed in percent by volume of the overall composition), such that the product $V_1 \times V_2$ is from 10 to 100 inclusive and the sum $V_1 + V_2$ is from 10 to 30 inclusive (that is, $10 \leq V_1 \times V_2 \leq 100$ and $10 \leq V_1 + V_2 \leq 30$). By satisfying these conditions, the inventive material has a vastly improved performance during high-speed braking.

The product $V_1 \times V_2$ is in a range of preferably 15 to 100, more preferably 20 to 90, and most preferably 20 to 80. The sum $V_1 + V_2$, which represents the combined amount of binder and graphite, is in a range of preferably 10 to 27, more preferably 15 to 25, and most preferably 17 to 28.

If the total amount of binder $V_1$ and the amount of graphite $V_2$ (both in volume percent) are such that the product $V_1 \times V_2$ and the sum $V_1 + V_2$ do not fall within the above ranges, the amount of organic components in the friction material becomes too large, lowering the heat resistance and compromising the performance during high-speed braking.

The binder may be any known binder commonly used in friction materials. Illustrative examples include phenolic resins, various rubber-modified phenolic resins such as high-ortho phenolic resins modified with acrylonitrile-butadiene rubber (NBR), NBR-modified phenolic resins and acrylic rubber-modified phenolic resins, and also melamine resins, epoxy resins, NBR, nitrile rubber and acrylic rubber. Any one or combinations of two or more of these may be used. The binder is included in a total amount $V_1$ which is up to 30 vol %, preferably up to 27 vol %, more preferably up to 25 vol %, even more preferably up to 23 vol %, and most preferably up to 20 vol %, based on the overall amount of the friction material composition. The amount of binder preferably has a lower limit of at least 5 vol %. Too large a total amount $V_1$ of the binder excessively increases the organic components within the friction material, lowering the heat resistance.

The graphite used in the non-asbestos friction material of the invention may be any known graphite commonly used in friction materials. The graphite may be a naturally produced or synthetic graphite, and may be in any form, such as scales, needles or spheres. The graphite has an average particle size of preferably 30 to 1,000 μm, and especially 50 to 500 μm.

The graphite is included in an amount $V_2$, based on the overall friction material composition, of less than 5 vol %, preferably from 1 vol % to less than 5 vol %, more preferably within a range of 1 to 4 vol %, and most preferably within a range of 1 to 3 vol %. The addition of too much graphite results in an excessive amount of organic components within the friction material, lowering the heat resistance of the friction material.

According to a second embodiment of the invention, the friction material, which is typically used for drum brakes, includes as at least part of the filler a high-tar cashew dust in an amount of 1 to 35 vol %, preferably 5 to 30 vol %, more preferably 5 to 25 vol %, and most preferably 10 to 25 vol %, based on the overall friction material composition. If the amount of high-tar cashew dust is outside the above range, the inventive friction material having a low amount of wear during high-speed braking and stable braking effectiveness cannot be achieved.

The high-tar cashew dust has a tar content of preferably at least 10 wt %, more preferably 10 to 15 wt %, and most preferably 10 to 13 wt %. Too low a tar content fails to result in the formation of a thin, uniform film on the friction surface, preventing the intended objects and advantages of the invention from being achieved. "Tar content," as used herein, refers to the weight percent of tar in the cashew dust, as measured by extraction with acetone. The tar content of the high-tar cashew dust used in the invention is significantly higher than the tar content of conventional cashew dust, which is typically 6 to 8 wt %. The high-tar cashew dust has an average particle size of preferably 50 to 500 μm, and especially 200 to 500 μm.

In addition to the above-described high-tar cashew dust and graphite, the friction material of the invention may include also other known organic or inorganic fillers commonly used in friction materials. Illustrative examples include molybdenum disulfide, antimony trisulfide, calcium carbonate, precipitated calcium carbonate, barium sulfate, magnesium oxide, calcium hydroxide, calcium fluoride, slaked lime, talc, molybdenum trioxide, antimony trioxide, zirconium silicate, iron oxide, mica, iron sulfide, zirconium oxide, metal powder, fused silica, silicon dioxide, alumina, chromium oxide, vermiculite, ground tire rubber, rubber dust (rubber powder and granules), nitrile rubber dust (vulcanized product), and acrylic rubber dust (vulcanized product). These may be used alone or as combinations of two or more thereof.

The amount of such fillers other than high-tar cashew dust and graphite is preferably from 10 to 60 vol %, and especially from 25 to 50 vol %, based on the overall frictional material composition.

The fibrous base may be any organic fiber or inorganic fiber other than asbestos that is commonly used in friction materials. Illustrative examples of suitable materials include inorganic fibers such as metal fibers (e.g., iron, copper, brass, bronze, and aluminum), ceramic fibers, potassium titanate fibers, glass fibers, carbon fibers, rock wool, wollastonite, sepiolite, attapulgite, and man-made mineral fibers; and organic fibers such as aramid fibers, polyimide fibers, polyamide fibers, phenolic fibers, cellulose, and acrylic fibers. Any one or combination of two or more of these may be used.

The fibrous base may be used in the form of short fibers or a powder. It is added in an amount of preferably 5 to 30 vol %, and most preferably 10 to 20 vol %, based on the overall friction material composition.

The method of making the non-asbestos friction material of the invention involves uniformly blending the above-described fibrous base, fillers and binder in a suitable mixer such as a Henschel mixer, Loedige mixer or Eirich mixer, and preforming the blend in a mold. The preform is then molded at a temperature of 130 to 200° C. and a pressure of 100 to 1,000 kg/cm$^2$ for a period of 2 to 15 minutes. The resulting molded article is postcured by heat-treating at 140 to 250° C. for 2 to 48 hours, then spray-painted, baked and ground as needed, giving the finished article.

In the case of automotive brake linings, production may be carried out by known methods.

The non-asbestos friction materials of the invention can be used in disk brakes or drum brakes, and are highly suitable for a variety of related applications, including disk pads, brake shoes and brake linings in automobiles, large trucks, railroad cars and various types of industrial equipment. They are particularly well-suited to use as brake linings in drum brakes.

EXAMPLES

Examples and comparative examples are given below by way of illustration, and are not intended to limit the invention.

Examples and Comparative Examples

The friction material compositions shown in Tables 1 and 2 were formulated, then uniformly blended in a Loedige mixer and preformed in a pressure mold under a pressure of 100 kg/cm$^3$ for 10 minutes. Each preform was molded for the desired length of time at a temperature and pressure of 160° C. and 250 kg/cm$^2$, then postcured by 5 hours of heat treatment at 200° C., yielding brake linings for drum brakes in each of Examples 1 to 10 and Comparative Examples 1 to 6.

The brake linings obtained in the examples were subjected to wear tests, strength tests, heat resistance tests and noise tests by the methods described below. The results are presented in Tables 1 and 2.

(1) Wear Test (According to JASO C407)

Test conditions were initial braking speed, 120 km/h; final braking speed, 60 km/h; braking deceleration, 0.25 g; number of braking cycles, 500; brake temperature before braking, 150° C. The amount of brake lining wear was measured.

(2) Strength Test

The degree of cracking that occurred when the brake lining was bolted and riveted to the brake shoe was rated as follows.

Very Good: No cracks
Good: Very few cracks
Fair: Relatively small number of cracks
Poor: Many cracks (3) Heat-Resistance Test (JASO C407)

Test conditions were initial braking speed, 100 km/h; braking deceleration, 0.45 g; number of braking cycles, 15; brake temperature before braking, 150° C. The minimum friction coefficient was rated as follows:

Good: more than 0.25
Fair: 0.20 to 0.25
Poor: less than 0.20

(4) Noise Test (JASO C404)

The degree of noise and the frequency of noise generation were rated as follows in a road vehicle test.

Good: No noise
Fair: Slight noise
Poor: Moderate noise

TABLE 1

| | Examples of the invention | | | | | | | | | |
|---|---|---|---|---|---|---|---|---|---|---|
| | 1 | 2 | 3 | 4 | 5 | 6 | 7 | 8 | 9 | 10 |
| Fibrous base | 12 | 12 | 12 | 12 | 12 | 14 | 14 | 14 | 12 | 14 |
| Organic fillers | | | | | | | | | | |
| Cashew dust A | 20 | 20 | 20 | 20 | 20 | 20 | | | 20 | 20 |
| Cashew dust B | | | | | | | 30 | | | |
| Cashew dust C | | | | | | | | 20 | | |
| Cashew dust D | | | | | | | | | | |
| Cashew dust E | | | | | | | | | | |
| Graphite | 3 | 2 | 1 | 2 | 2 | 3 | 2 | 2 | 2 | 2 |
| Rubber (powder + granules) | 9 | 9 | 9 | 12 | 2 | 9 | 2 | 9 | 9 | 12 |
| Binders | | | | | | | | | | |
| Phenolic resin A | 20 | 20 | 20 | 16 | 24 | 25 | 20 | 20 | | 15 |
| Phenolic resin B | | | | | | | | | 20 | |
| Inorganic fillers | | | | | | | | | | |
| Calcium carbonate | 13 | 14 | 15 | 15 | 18 | 9 | 12 | 14 | 14 | 14 |
| Barium sulfate | 5 | 5 | 5 | 5 | 5 | 3 | 2 | 5 | 5 | 5 |
| Slaked lime | 2 | 2 | 2 | 2 | 2 | 2 | 4 | 2 | 2 | 2 |
| Others | 16 | 16 | 16 | 16 | 15 | 15 | 14 | 14 | 16 | 16 |
| Total (vol %) | 100 | 100 | 100 | 100 | 100 | 100 | 100 | 100 | 100 | 100 |
| $V_1 \times V_2$ | 60 | 40 | 20 | 32 | 48 | 75 | 40 | 40 | 40 | 30 |
| $V_1 + V_2$ | 23 | 22 | 21 | 18 | 26 | 28 | 22 | 22 | 22 | 17 |
| Amount of wear (mm) | 0.1 | 0.2 | 0.3 | 0.2 | 0.4 | 0.5 | 0.3 | 0.4 | 0.4 | 0.4 |
| Friction material strength | very good | very good | very good | good | very good | very good | very good | very good | very good | good |
| Heat resistance test | good | good | good | good | good | good | fair | good | good | fair |
| Noise test | good | good | good | good | fair | fair | fair | good | good | good |

TABLE 2

| | | Comparative Examples | | | | | |
|---|---|---|---|---|---|---|---|
| | | 1 | 2 | 3 | 4 | 5 | 6 |
| Fibrous base | | 14 | 14 | 14 | 14 | 14 | 14 |
| Organic fillers | Cashew dust A | | | | | 20 | 20 |
| | Cashew dust B | 20 | | | | | |
| | Cashew dust C | | 20 | | | | |
| | Cashew dust D | | | 20 | | | |
| | Cashew dust E | | | | 20 | | |
| | Graphite | 7 | 5 | 7 | 7 | 7 | 7 |
| | Rubber (powder + granules) | 6 | 6 | 9 | 9 | 2 | 8 |
| Binders | Phenolic resin A | 25 | 26 | 23 | 23 | 28 | 30 |
| | Phenolic resin B | | | | | | |
| Inorganic fillers | Calcium carbonate | 13 | 14 | 12 | 12 | 14 | 14 |
| | Barium sulfate | 5 | 5 | 5 | 5 | 5 | 5 |
| | Slaked lime | 2 | 2 | 2 | 2 | 2 | 2 |
| | Others | 8 | 8 | 8 | 8 | 8 | 0 |

TABLE 2-continued

|  | Comparative Examples | | | | | |
| --- | --- | --- | --- | --- | --- | --- |
|  | 1 | 2 | 3 | 4 | 5 | 6 |
| Total (vol %) | 100 | 100 | 100 | 100 | 100 | 100 |
| $V_1 \times V_2$ | 175 | 130 | 161 | 161 | 196 | 210 |
| $V_1 + V_2$ | 32 | 31 | 30 | 30 | 35 | 37 |
| Amount of wear (mm) | 0.7 | 0.7 | 0.8 | 1.1 | 0.7 | 0.9 |
| Friction material strength | very good | very good | very good | very good | very good | very good |
| Heat resistance test | good | good | good | good | fair | fair |
| Noise test | fair | poor | good | good | poor | poor |

In Tables 1 and 2, $V_1$ represents the total amount of binder in the respective compositions and $V_2$ represents the amount of graphite. Both values are expressed in percent by volume based on the overall composition. The fibrous base in the above examples was a mixture of aramid fibers and glass fibers. In the tables, "Others" refers to other inorganic fillers such as precipitated calcium carbonate. Additional items in the tables are described below.

Cashew dust A: Tar content, 12 wt %; average particle size, approx. 400 μm
Cashew dust B: Tar content, 11 wt %; average particle size, approx. 400 μm
Cashew dust C: Tar content, 10 wt %; average particle size, approx. 400 μm
Cashew dust D: Tar content, 8 wt %; average particle size, approx. 360 μm
Cashew dust E: Tar content, 6 wt %; average particle size, approx. 360 μm The tar contents in the cashew dusts were measured by acetone extraction.
Phenolic resin A: NBR rubber-modified high-ortho phenolic resin
Phenolic resin B: NBR rubber-modified phenolic resin
Graphite: Average particle size, approx. 220 μm As is apparent from the above results, the non-asbestos friction materials of the invention have low wear during high-speed braking, excellent heat resistance, stable braking effectiveness and good strength.

Japanese Patent Application No. 2000-058348 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material obtained by molding and curing a composition comprising a fibrous base, a filler and a binder;
   wherein the filler is at least partially composed of 1 to 35 vol % of tar-containing cashew dust having a tar content of from 10 to 13 wt % and 1 to 4 vol % of graphite, based on the overall composition, and the binder is present in a total amount of at most 30 vol %;
   wherein the binder is present in a total amount $V_1$ and the filler includes in part graphite present in an amount $+V_2$, each expressed in volume percent of the overall composition, such that the product $V_1 \times V_2$ is from 20 to 80 inclusive, and the sum $V_1+V_2$ is from 17 to 28.

2. The friction material of claim 1, wherein the binder is a phenolic resin.

3. The friction material of claim 1, wherein the binder is selected from the group consisting of melamine resins, epoxy resins, nitrile rubber, acrylic rubber and mixtures thereof.

4. The friction material of claim 1, wherein the graphite has an average particle size of from about 30 to about 1,000 μm.

* * * * *